United States Patent [19]
Kim

[11] Patent Number: 5,947,740
[45] Date of Patent: Sep. 7, 1999

[54] SIMULATOR HAVING A WEIGHT SUPPORTING ACTUATOR

[75] Inventor: Jeoung-Tae Kim, Seoul, Rep. of Korea

[73] Assignee: Daewoo Electronics Co., Ltd., Rep. of Korea

[21] Appl. No.: 09/096,344

[22] Filed: Jun. 12, 1998

[30] Foreign Application Priority Data

Jun. 30, 1997 [KR]  Rep. of Korea ..................... 97/29976

[51] Int. Cl.⁶ .............................. G09B 9/02; G09B 9/08; G09B 9/04
[52] U.S. Cl. ................................ 434/29; 434/30; 434/55; 434/58; 434/62
[58] Field of Search ................................ 434/29, 30, 51, 434/55, 57, 58, 62

[56] References Cited

U.S. PATENT DOCUMENTS 4,343,610  8/1982  Chou ........................................ 434/58
5,605,462  2/1997  Denne ....................................... 434/55

*Primary Examiner*—Robert A. Hafer
*Assistant Examiner*—John Edmund Rovnak
*Attorney, Agent, or Firm*—Pennie & Edmonds LLP

[57] ABSTRACT

A simulator includes a base plate, a platform, a plurality of actuators, each of the actuators having a hydraulic cylinder, a sensor, a servo valve and a pair of universal joints, and a weight supporting actuator including a pressure sensor and designed to support a specific weight of the platform and the substance thereon. The sensors and the pressure sensor sense the variation of length and weight imposed on each of the hydraulic cylinders, respectively. The servo valve selectively passes a high pressure fluid to an upper and a lower portions of the cylinder and the pair of universal joints have a three degrees of freedom to allow the platform to have six degrees of freedom. A controller controls the servo valve of both actuators to vary the length of each of the hydraulic cylinders thereof, thereby lessening the load imposed on the actuators.

5 Claims, 6 Drawing Sheets

SIMULATOR HAVING A WEIGHT SUPPORTING ACTUATOR

FIELD OF THE INVENTION

The present invention relates to a simulator; and, more particularly, to a simulator incorporating a weight supporting actuator to support actuators therein.

BACKGROUND OF THE INVENTION

A simulator is a device that enables an operator to reproduce or represent under test conditions phenomena likely to occur in actual performance. An example of the simulators is a virtual reality seat used for a cockpit model for training a driver of a car.

FIG. 1 illustrates a schematic view of a prior art simulator and FIG. 2 is a plan view of the simulator depicted in FIG. 1. The prior art simulator is provided with a base plate 100, a platform 200, and six actuators 300, the base plate 100 and the platform 200 being mechanically connected to each other through the actuators 300.

Each of the actuators 300, as shown in FIG. 3, is provided with a hydraulic cylinder 310, a sensor 320, a servo valve 330 and a pair of universal joints 350. The hydraulic cylinder 310 has a cylinder 311 and a plunger 312. The sensor 320 for sensing variation of length of the hydraulic cylinder 310 includes a sensor body 321 and a sensor rod 322 mounted on the cylinder 311 and the plunger 312, respectively. The universal joints 350 are mounted on the top and the bottom ends of the hydraulic cylinder 310, respectively.

A piston 313 is connected to one end of the plunger 312 which is inserted into the cylinder 311, dividing the inner space of the cylinder 311 into two parts. The upper part of the cylinder 311 is communicated with the lower part thereof through a pipe 314 and the servo valve 330. The servo valve 330 is connected with an inflow pipe 315 and an outflow pipe 316 for inflowing and outflowing a high pressure fluid, respectively.

When the high pressure fluid is flown into the hydraulic cylinder 310 through the inflow pipe 315, the servo valve 330 selectively passes the high pressure fluid to the upper part or lower part of the cylinder 311 to thereby vary the length of the hydraulic cylinder 310. At this time, the fluid is flown to the outer space of the hydraulic cylinder 310 through the outflow pipe 316.

The universal joints 350 help the actuator 300 to connect and support the base plate 100 and the platform 200 irrespective of the length of the hydraulic cylinder 310. Further, each of the universal joints 350 has a three degrees of freedom, allowing the platform 200 to have six degrees of freedom.

The operation of the prior art simulator is as follows:

When an operational signal is inputted into a controller (not shown), the controller generates and outputs a corresponding servo valve controlling signal to each of the servo valves 330 to control the length of the actuators 300. The sensors 320 sense and input the variations of length of the actuators 300 back to the controller. This process is repeated until an appropriate response to the operational signal obtained.

However, in the prior art simulator, when the platform is inclined by the respective variation of length of each of the actuators, resulting in each of the actuators having different length, a greater load is imposed on shorter actuators than on longer actuators. In order to accommodate this situation, each of the actuators are designed and manufactured to have a larger tolerance than necessary, increasing the manufacturing cost thereof.

SUMMARY OF THE INVENTION

It is, therefore, a primary object of the present invention to provide a simulator incorporating a weight supporting actuator to support actuators therein.

The above and other objects of the present invention are accomplished by providing a simulator comprising: a base plate; a platform; a plurality of actuators, each of the actuators having a hydraulic cylinder, a sensor, a servo valve and a pair of universal joints; a weight supporting actuator including a hydraulic cylinder, a pressure sensor, a servo valve and a pair of universal joints and designed to support a specific weight of the platform and the substance thereon, wherein the sensors and the pressure sensor sense the variation of length and weight of each of the hydraulic cylinders, respectively, each of the servo valves selectively passes a high pressure fluid to an upper and a lower portions of each of the respective cylinders and each pair of universal joints have a three degrees of freedom to allow the platform to have six degrees of freedom; and a controller for controlling each of the servo valves of both actuators to vary the length of each of the hydraulic cylinders thereof, thereby lessening the load imposed on the actuators.

BRIEF DESCRIPTION OF THE DRAWINGS

The above and other objects and features of the instant invention will become apparent from the following description of preferred embodiment taken in conjunction with the accompanying drawings, in which.

DETAILED DESCRIPTION OF THE PREFERRED EMBODIMENTS

Figure 1:
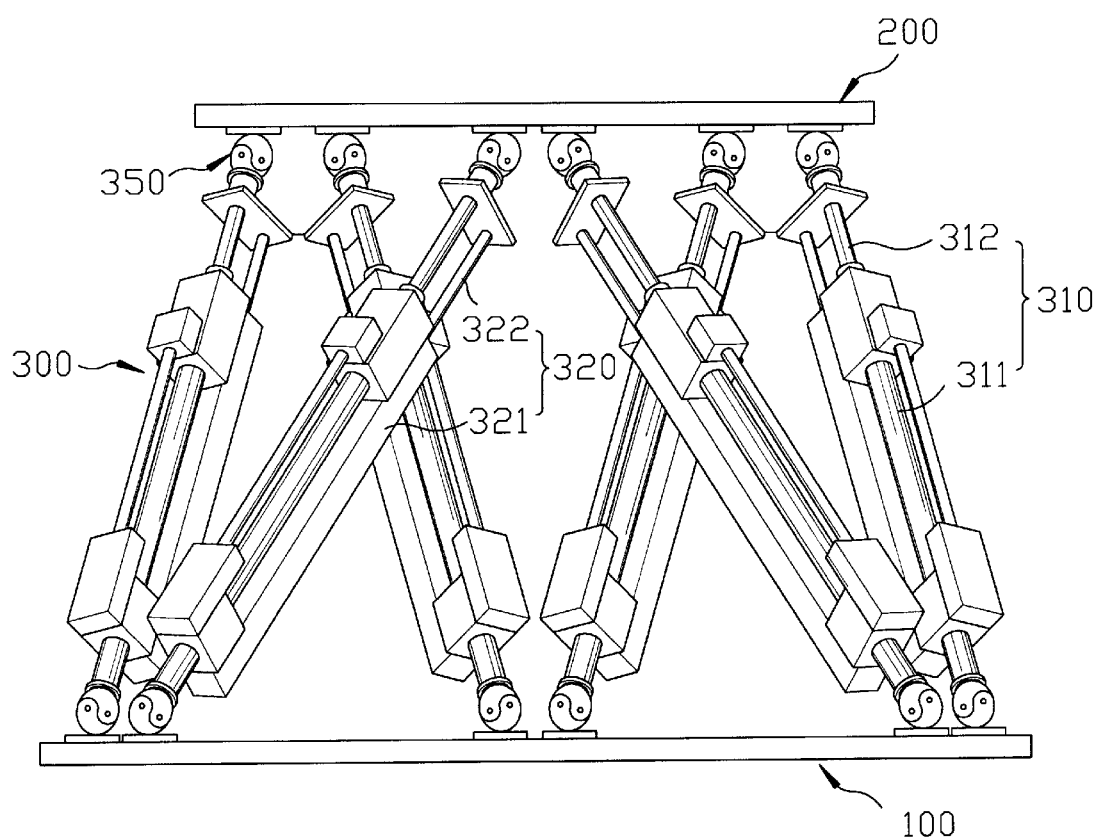
FIG. 1 illustrates a schematic view of a prior art simulator.
Figure 2:
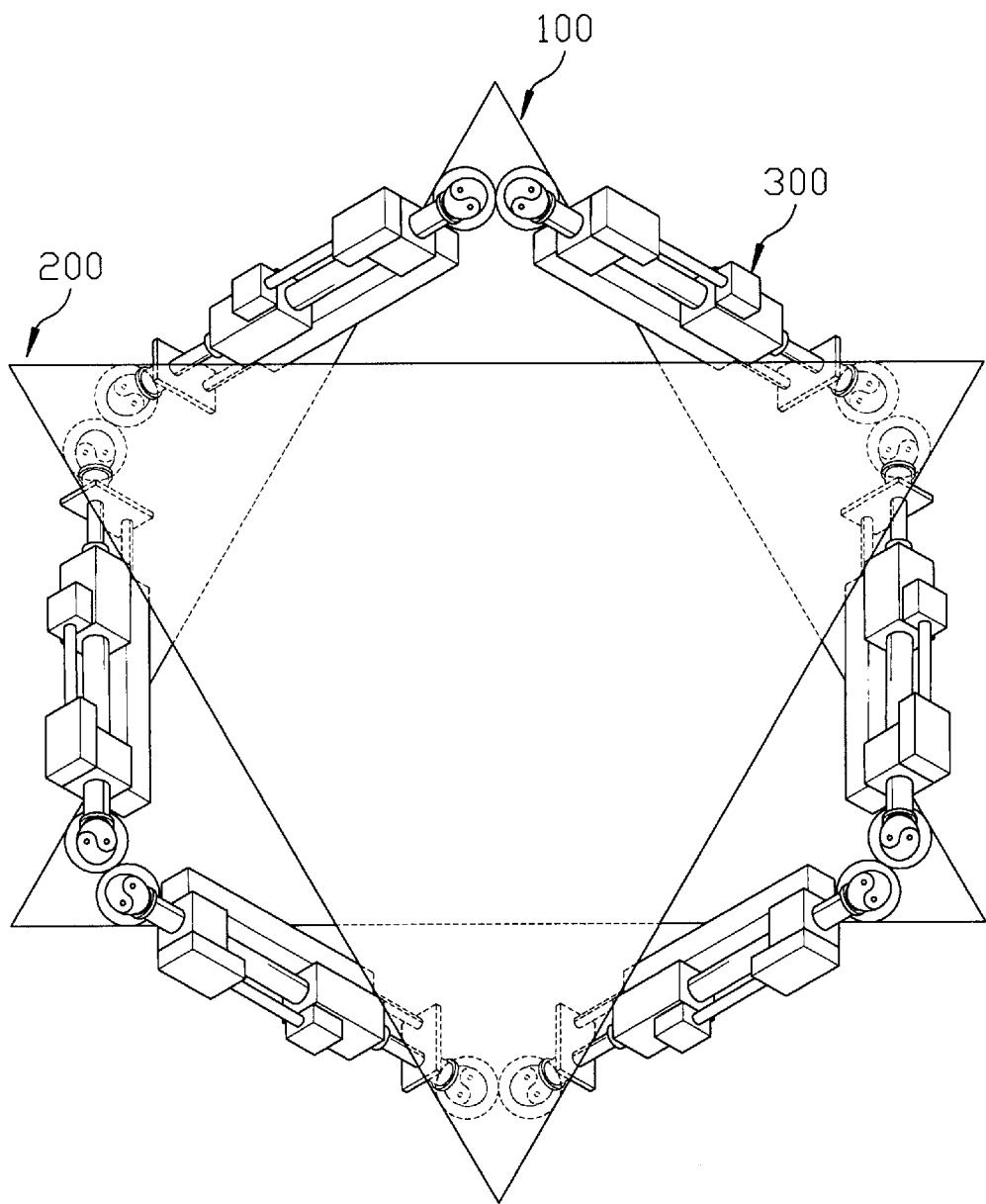
FIG. 2 is a plan view of the simulator depicted in FIG. 1.
Figure 3:
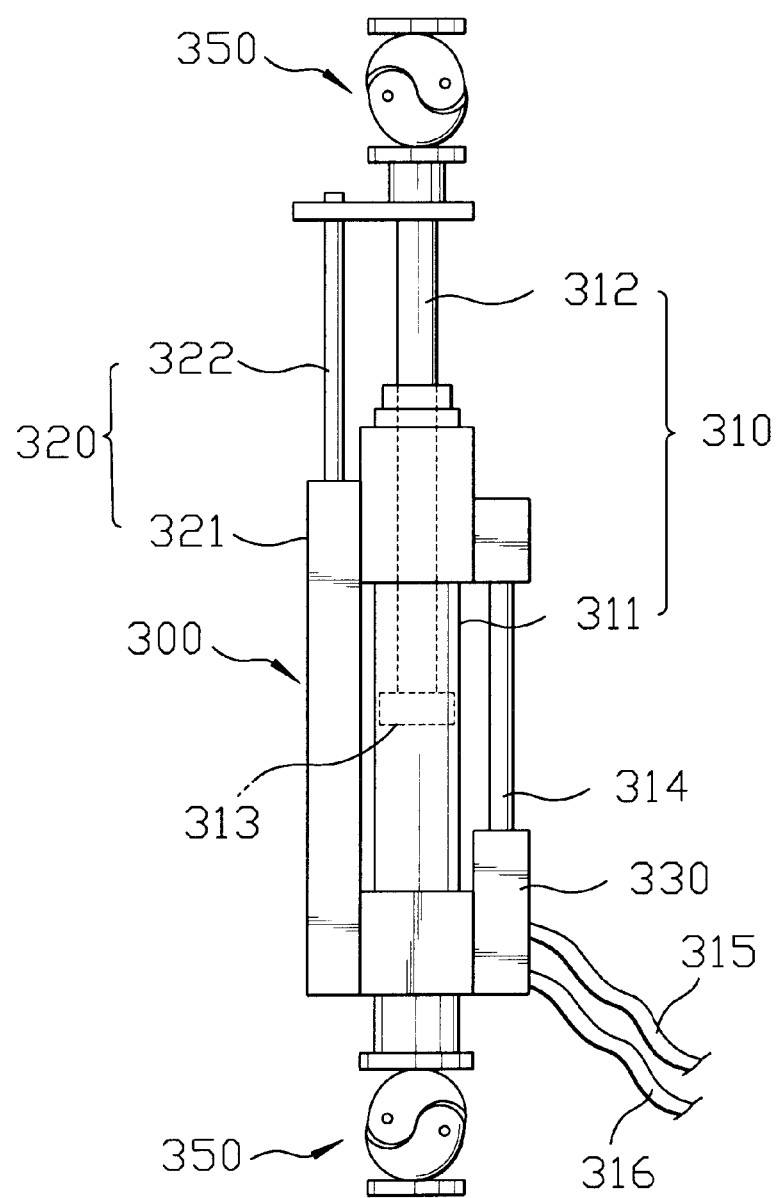
FIG. 3 presents a schematic view of an actuator in FIG.
Figure 4:
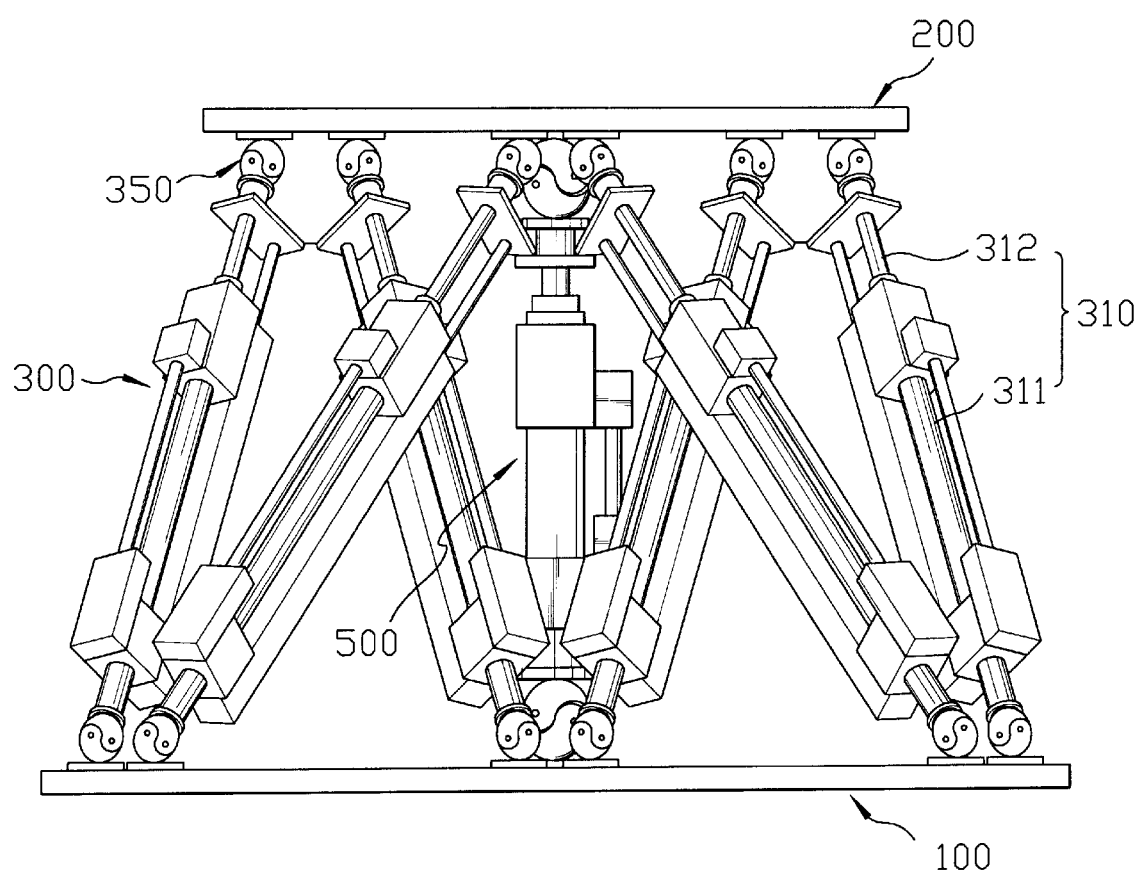
FIG. 4 provides a schematic view of a simulator in accordance with a preferred embodiment of the present invention.
Figure 5:
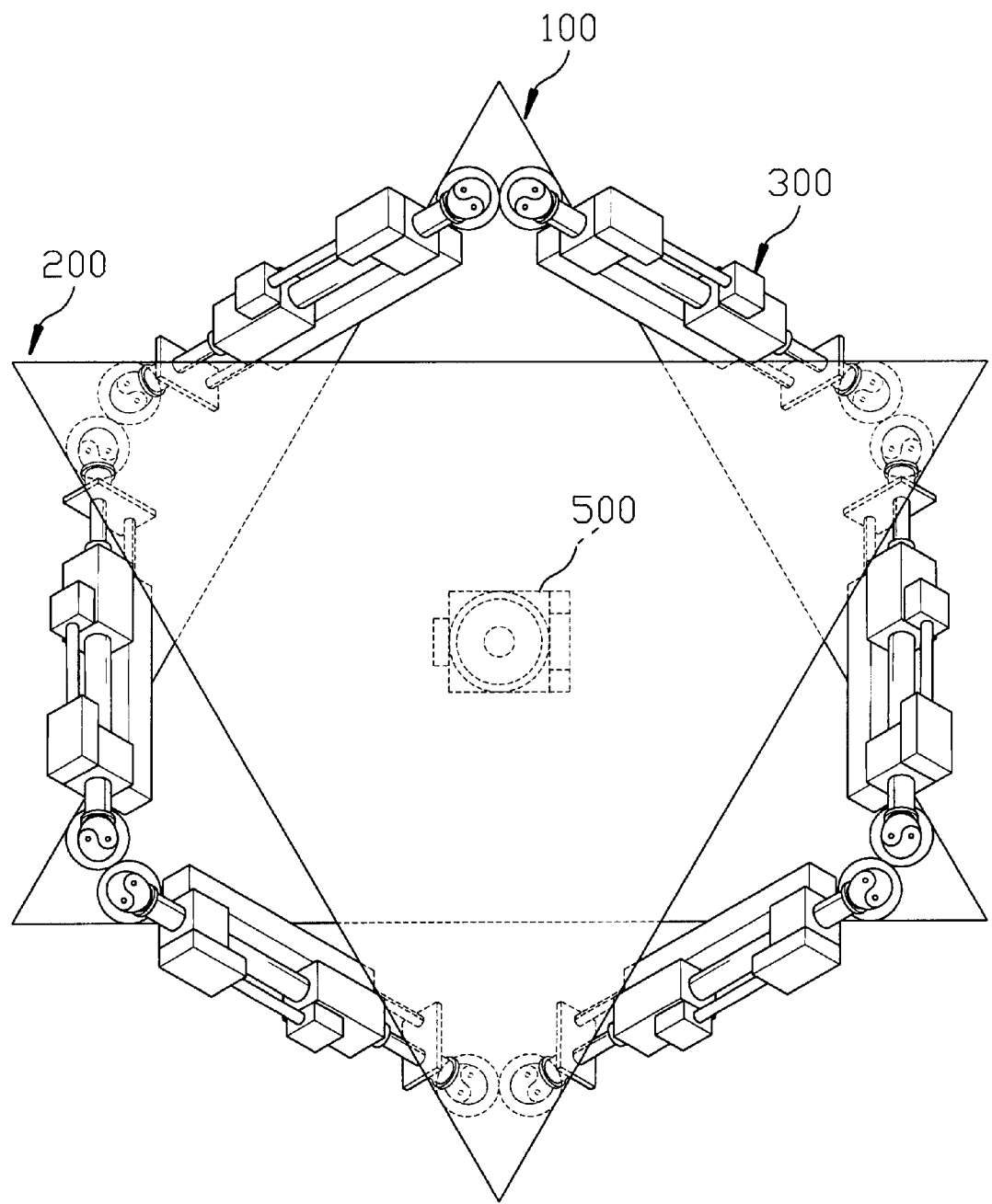
FIG. 5 represents a plan view of the simulator depicted in FIG. 4.

As shown in FIG. 4 and 5, a simulator in accordance with a preferred embodiment of the present invention comprises a base plate 100, a platform 200, a plurality of actuators 300 and a weight supporting actuator 500, the base plate 100 and the platform 200 being mechanically connected to each other through the actuators 300 and the weight supporting actuator 500 which are controlled by a controller (not shown). Further, it is preferable that the number of actuators 300 maybe six. The base plate 100, the platform 200 and each of the actuators 300 of the present invention are similar to that of the prior art as described above.

Figure 6:
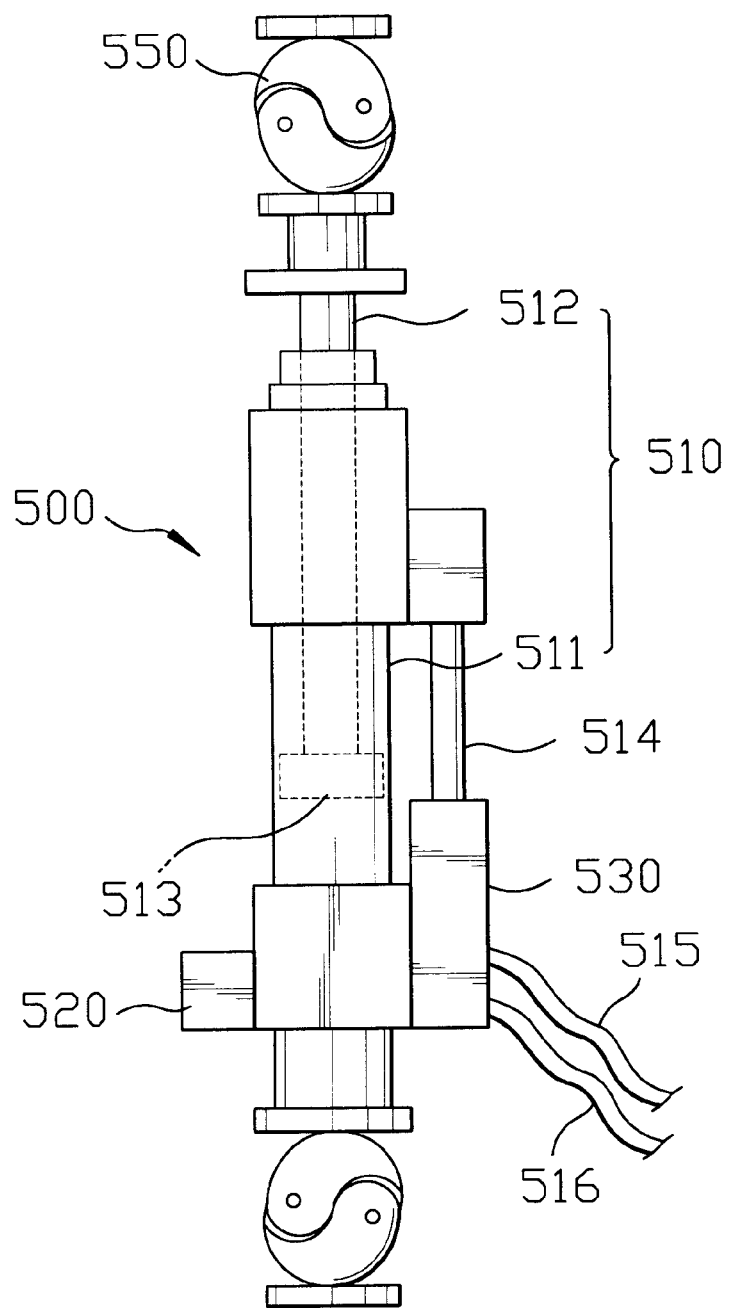
FIG. 6 describes a schematic view of a weight supporting actuator in accordance with the preferred embodiment of the present invention.

As shown in FIG. 6, the weight supporting actuator 500 of the present invention is provided with a hydraulic cylinder 510, a pressure sensor 520, a servo valve 530 and a pair of universal joints 550. Further, the lower and the upper universal joints 550 of the weight supporting actuator 500 are disposed at the center of mass of polygons, the polygons being formed on the base plate 100 and on the platform 200, respectively, by the universal joints 350 at the lower end and the upper end of each of the actuators 300. Also, the hydraulic cylinder 510, the servo valve 530 and the universal joints 550 of the weight supporting actuator 500 are similarly operated as described above. Accordingly, the same constructions of the prior art as described above will not be further discussed herein for the sake of economy. Rather, the following discussions are primarily directed to the weight supporting actuator 500 of the present invention.

The weight supporting actuator 500 of the present invention is designed to support a specific portion, for instance, 30%, of the total weight of the platform 200 and the substance thereon, lessening the load that can be imposed on each of the actuators 300. Mounted on the cylinder 511 is the pressure sensor 520 which can sense the variations of weight imposed on the platform 200 and output the sensed signal to the controller. The controller, then, compares the sensed signal from the pressure sensor 520 and an operational signal which has been inputted thereto and outputs an appropriate signal to thereby control the servo valve 530 to vary the length of the hydraulic cylinder 510, allowing the weight supporting actuator 500 to support the specific portion of the weight of the platform 200 and the substance thereon. In other words, during the operation of the simulator, the weight supporting actuator 500 of the present invention lessens the load imposed on each of th e actuators 300, allowing the actuators 300 to be designed and manufactured to have a smaller tolerance than needed than in the prior art simulator, decreasing the manufacturing cost thereof. Therefore, the capacity and the largeness of the actuator 300 can be cut down.

Further, the fluid in the actuators 300 can be replaced with air, without changing the structure of the actuators 300. When using the air, the power of the actuators 300 is less than when using the fluid. However, the maintenance cost is lower using the air than when using the fluid.

The hydraulic cylinders 310 and the hydraulic cylinders 510 all may be substituted with linear motors .

Although the invention has been shown and described with respect to the preferred embodiment, it will be understood by those skilled in the art that various changes and modifications may be made without departing from the spirit and scope of the invention as defined in the following claims.

What is claimed is:

1. A simulator comprising:

a base plate;

a platform;

a plurality of actuators, each of the actuators having a hydraulic cylinder, a sensor, a servo valve and a pair of universal joints;

a weight supporting actuator including a hydraulic cylinder, a pressure sensor, a servo valve and a pair of universal joints and designed to support a specific weight of said platform and the substance thereon, wherein the sensors and the pressure sensor sense the variation of length and weight of each of the hydraulic cylinders, respectively, each of the servo valves selectively passes a high pressure fluid to an upper and a lower portions of each of the respective cylinders and each pair of universal joints has three degrees of freedom to allow said platform to have six degrees of freedom; and means for controlling each of the servo valves of both actuators to vary the length of each of the hydraulic cylinders thereof, thereby lessening the load imposed on the actuators.

2. The simulator according to claim 1, wherein the weight supporting actuator is controlled by hydraulic pressure.

3. The simulator according to claim 1, wherein the plurality of actuators are controlled by air pressure.

4. The simulator according to claim 1, wherein the weight supporting actuator and each of the actuators are linear motors.

5. The simulator according to claim 1, wherein the lower universal joints and the upper universal joints of the weight supporting actuator are disposed at the center of mass of polygons, the polygons being formed on the base plate and on the platform, respectively, by the universal joints at the lower end and the universal joints at the upper end of each of the actuators.

* * * * *